United States Patent
Cho et al.

(10) Patent No.: US 10,496,745 B2
(45) Date of Patent: Dec. 3, 2019

(54) DICTIONARY UPDATING APPARATUS, DICTIONARY UPDATING METHOD AND COMPUTER PROGRAM PRODUCT

(71) Applicants: Kabushiki Kaisha Toshiba, Minato-ku (JP); Toshiba Digital Solutions Corporation, Kawasaki-shi (JP)

(72) Inventors: Kenta Cho, Kawasaki (JP); Kazuyuki Goto, Kawasaki (JP); Yasunari Miyabe, Kawasaki (JP); Masahisa Shinozaki, Tokorozawa (JP); Keisuke Sakanushi, Mitaka (JP); Guowei Zu, Inagi (JP); Kaoru Hirano, Kunitachi (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 38 days.

(21) Appl. No.: 15/689,133

(22) Filed: Aug. 29, 2017

(65) Prior Publication Data
US 2018/0067920 A1    Mar. 8, 2018

(30) Foreign Application Priority Data
Sep. 6, 2016 (JP) ................................. 2016-173918

(51) Int. Cl.
*G06F 17/27* (2006.01)
*G06F 17/28* (2006.01)
(Continued)

(52) U.S. Cl.
CPC ...... *G06F 17/2735* (2013.01); *G06F 17/2863* (2013.01); *G10L 15/04* (2013.01);
(Continued)

(58) Field of Classification Search
USPC ....................................................... 704/1–504
See application file for complete search history.

(56) References Cited

U.S. PATENT DOCUMENTS

| 4,866,646 A * | 9/1989 | Nakamura | G06F 3/033 |
| | | | 708/141 |
| 6,097,841 A * | 8/2000 | Gunji | G06K 9/72 |
| | | | 382/229 |

(Continued)

FOREIGN PATENT DOCUMENTS

| JP | 11-202886 A | 7/1999 |
| JP | 2005-241829 A | 9/2005 |

(Continued)

*Primary Examiner* — Marcus T Riley
(74) *Attorney, Agent, or Firm* — Oblon, McClelland, Maier & Neustadt, L.L.P.

(57) ABSTRACT

According to an embodiment, a dictionary updating apparatus includes a candidate extraction unit, a selection control unit, and a word registration unit. The candidate extraction unit extracts, based on a recognition result text obtained by a voice recognition engine performing a voice recognition processing using a word dictionary and a correction result text obtained by correcting at least a part of the recognition result text, candidates of words to be additionally registered in the word dictionary. The selection control unit generates a selection screen on which the extracted candidates are displayed selectably and, at the same time, information indicating the influence on the voice recognition processing at least when the candidates are additionally registered in the word dictionary is displayed, and accepts an operation of selecting the candidates displayed on the selection screen. The word registration unit registers additionally the candidates selected on the selection screen in the word dictionary.

11 Claims, 9 Drawing Sheets

(51) Int. Cl.
*G10L 15/04* (2013.01)
*G10L 15/06* (2013.01)
*G10L 15/065* (2013.01)
*G10L 15/187* (2013.01)

(52) U.S. Cl.
CPC .......... *G10L 15/063* (2013.01); *G10L 15/065* (2013.01); *G10L 15/187* (2013.01); *G10L 2015/0631* (2013.01)

(56) References Cited

U.S. PATENT DOCUMENTS

| | | | | |
|---|---|---|---|---|
| 6,266,642 | B1* | 7/2001 | Franz | G06F 17/271 704/257 |
| 6,278,968 | B1* | 8/2001 | Franz | G06F 17/2765 345/171 |
| 6,282,507 | B1* | 8/2001 | Horiguchi | G06F 17/271 345/171 |
| 6,952,675 | B1* | 10/2005 | Tahara | G10L 15/08 704/255 |
| 6,983,248 | B1* | 1/2006 | Tahara | G10L 15/187 704/255 |
| 8,311,807 | B2* | 11/2012 | Kang | G06F 17/2845 704/1 |
| 8,620,658 | B2* | 12/2013 | Nakade | G10L 15/30 704/10 |
| 2001/0037200 | A1* | 11/2001 | Ogawa | G10L 17/02 704/246 |
| 2002/0046033 | A1* | 4/2002 | Ono | G10L 15/063 704/270 |
| 2005/0075877 | A1* | 4/2005 | Minamino | G10L 15/08 704/254 |
| 2006/0100856 | A1* | 5/2006 | Kang | G06F 17/2735 704/9 |
| 2009/0055185 | A1* | 2/2009 | Nakade | G10L 15/30 704/257 |
| 2009/0259467 | A1* | 10/2009 | Sumiyoshi | G10L 17/00 704/246 |
| 2010/0057457 | A1* | 3/2010 | Ogata | G10L 15/04 704/235 |
| 2015/0179173 | A1* | 6/2015 | Cho | G06F 17/2735 704/235 |
| 2018/0067920 | A1* | 3/2018 | Cho | G06F 17/2735 |

FOREIGN PATENT DOCUMENTS

| | | |
|---|---|---|
| JP | 2008-158510 | 7/2006 |
| JP | 4120550 | 7/2008 |
| JP | 5366169 | 12/2013 |

* cited by examiner

| USER ID | USER NAME | CORRECTION TASK PROFICIENCY LEVEL |
|---|---|---|
| ⋮ | ⋮ | ⋮ |
| 3 | SAKASHITA | 2 |
| 4 | TAMURA | 15 |
| ⋮ | ⋮ | ⋮ |

| VOICE ID | USER ID | VOICE | DATE AND TIME OF UTTERANCE |
|---|---|---|---|
| ⋮ | ⋮ | ⋮ | ⋮ |
| 15 | 2 | [BYTE DATA] | 2016/4/14 10:12:35 |
| 16 | 3 | [BYTE DATA] | 2016/4/14 10:13:11 |
| ⋮ | ⋮ | ⋮ | ⋮ |

| WORD ID | NOTATION | READING |
|---|---|---|
| ⋮ | ⋮ | ⋮ |
| 7 | VoIP | ぼいすおーばーあいぴー |
| 8 | 共通PF | きょうつうプラットフォーム |
| ⋮ | ⋮ | ⋮ |

| RECOGNITION RESULT ID | VOICE ID | DATE AND TIME OF UTTERANCE | RECOGNITION RESULT TEXT |
|---|---|---|---|
| ⋮ | ⋮ | ⋮ | ⋮ |
| 65 | 15 | 2016/4/14 10:12:37 | 理解あは人の動きを把握し認識します |
| 66 | 15 | 2016/4/14 10:12:40 | 目標とするしい英字アールは15%になります |
| 67 | 16 | 2016/4/14 10:13:15 | このように李会あはさまざまなメディア処理を行います |
| ⋮ | ⋮ | ⋮ | ⋮ |

FIG.6

| CORRECTION RESULT ID | RECOGNITION RESULT ID | CORRECTION USER ID | DATE AND TIME OF CORRECTION | CORRECTION RESULT TEXT |
|---|---|---|---|---|
| ⋮ | ⋮ | ⋮ | ⋮ | ⋮ |
| 32 | 65 | 2 | 2016/4/14 10:13:01 | リカイアは人の動きを把握し認識します |
| 33 | 66 | 3 | 2016/4/15 9:12:05 | 目標とするCAGRは15%になります |
| ⋮ | ⋮ | ⋮ | ⋮ | ⋮ |

FIG.7

| CANDI-DATE ID | NOTATION | READING | CORREC-TION RESULT ID | ACCURACY IMPROVEMENT CONTRIBUTION RATIO | SCORE | SCORE INCREASE FACTOR INFORMATION | SCORE DECREASE FACTOR INFORMATION |
|---|---|---|---|---|---|---|---|
| ... | ... | ... | ... | ... | ... | ... | ... |
| 42 | リカイテ | りかいあ | 32, 56, 58 | 0.3 | 25 | IMPORTANT WORD IN RELATED DOCUMENT CORRECTION FREQUENCY IS HIGH | - |
| 43 | CAGR | しいえいじいあーる | 33 | 1.1 | 12 | EFFECT OF IMPROVING ACCURACY IS HIGH | - |
| 44 | WebAPI | うえぶえいぴいあい | 37 | 0.5 | 8 | CORRECTION BY PROFICIENT USER | - |
| 45 | Re: | り | 48 | -0.2 | -2 | - | SHORT WORD |
| ... | ... | ... | ... | ... | ... | ... | ... |

| DOCUMENT ID | USER ID | FILE NAME | IMPORTANT WORD |
|---|---|---|---|
| ⋮ | ⋮ | ⋮ | ⋮ |
| 7 | 2 | service.ppt | リカイア, Paas, SaaS |
| 8 | 3 | PROCEDURE MANUAL.doc | TBD, CenOS |
| ⋮ | ⋮ | ⋮ | ⋮ |

| EVALUATION DATA ID | EVALUATION VOICE | TRANSCRIBED TEXT |
|---|---|---|
| ⋮ | ⋮ | ⋮ |
| 9 | [BYTE DATA] | …リカイアは当社が開発したクラウドサービスです。 |
| 10 | [BYTE DATA] | …CAGRは複利計算によって求めた成長率で… |
| ⋮ | ⋮ | ⋮ |

DICTIONARY UPDATING APPARATUS, DICTIONARY UPDATING METHOD AND COMPUTER PROGRAM PRODUCT

CROSS-REFERENCE TO RELATED APPLICATIONS

This application is based upon and claims the benefit of priority from Japanese Patent Application No. 2016-173918, filed on Sep. 6, 2016; the entire contents of which are incorporated herein by reference.

FIELD

Embodiments described herein relate generally to a dictionary updating device, a dictionary updating method and a computer program product.

BACKGROUND

Conventionally, there is known a technique of additionally registering a word that is not registered in a word dictionary in accordance with a user's correction operation on a recognition result in a voice recognition system that performs voice recognition processing using a word dictionary. In this conventional technique, when the word corrected by the user is not registered in a word dictionary, the corrected word is additionally registered in the word dictionary automatically. For this reason, words that may affect the voice recognition processing adversely when registered in the word dictionary may be registered additionally, which needs to be improved.

BRIEF DESCRIPTION OF THE DRAWINGS

FIG. 2 is a diagram illustrating an example of user data.
FIG. 3 is a diagram illustrating an example of audio data;
FIG. 4 is a diagram illustrating an example of a word dictionary;
FIG. 5 is a diagram illustrating an example of recognition result data;
FIG. 6 is a diagram illustrating an example of correction result data;
FIG. 7 is a diagram illustrating an example of candidate data;
FIG. 8 is a diagram illustrating an example of related document data;
FIG. 9 is a diagram illustrating an example of evaluation data.

DETAILED DESCRIPTION

According to an embodiment, a dictionary updating apparatus includes a candidate extraction unit, a selection control unit, and a word registration unit. The candidate extraction unit extracts, based on a recognition result text obtained by a voice recognition engine performing a voice recognition processing using a word dictionary and a correction result text obtained by correcting at least a part of the recognition result text, candidates of words to be additionally registered in the word dictionary. The selection control unit generates a selection screen on which the extracted candidates are displayed selectably and, at the same time, information indicating the influence on the voice recognition processing at least when the candidates are additionally registered in the word dictionary is displayed, and accepts an operation of selecting the candidates displayed on the selection screen. The word registration unit registers additionally the candidates selected on the selection screen in the word dictionary.

Hereinafter, a dictionary updating apparatus, a dictionary updating method, and a computer program product according to the embodiment will be described in detail with reference to the drawings. Hereinafter, an example of realizing the dictionary updating apparatus of the embodiment as an extended function of a voice recognition system that performs voice recognition processing using a word dictionary will be described. As an example, the voice recognition system can be realized as a server apparatus of a server/client system using a network. This server apparatus extracts candidates of words to be additionally registered in the word dictionary in response to a correction operation on a recognition result text obtained by the voice recognition processing using the word dictionary. Then, a word selection screen to be described later which displays the extracted candidates selectively is generated, and the selected candidate on the word selection screen is registered in the word dictionary.

Figure 1:
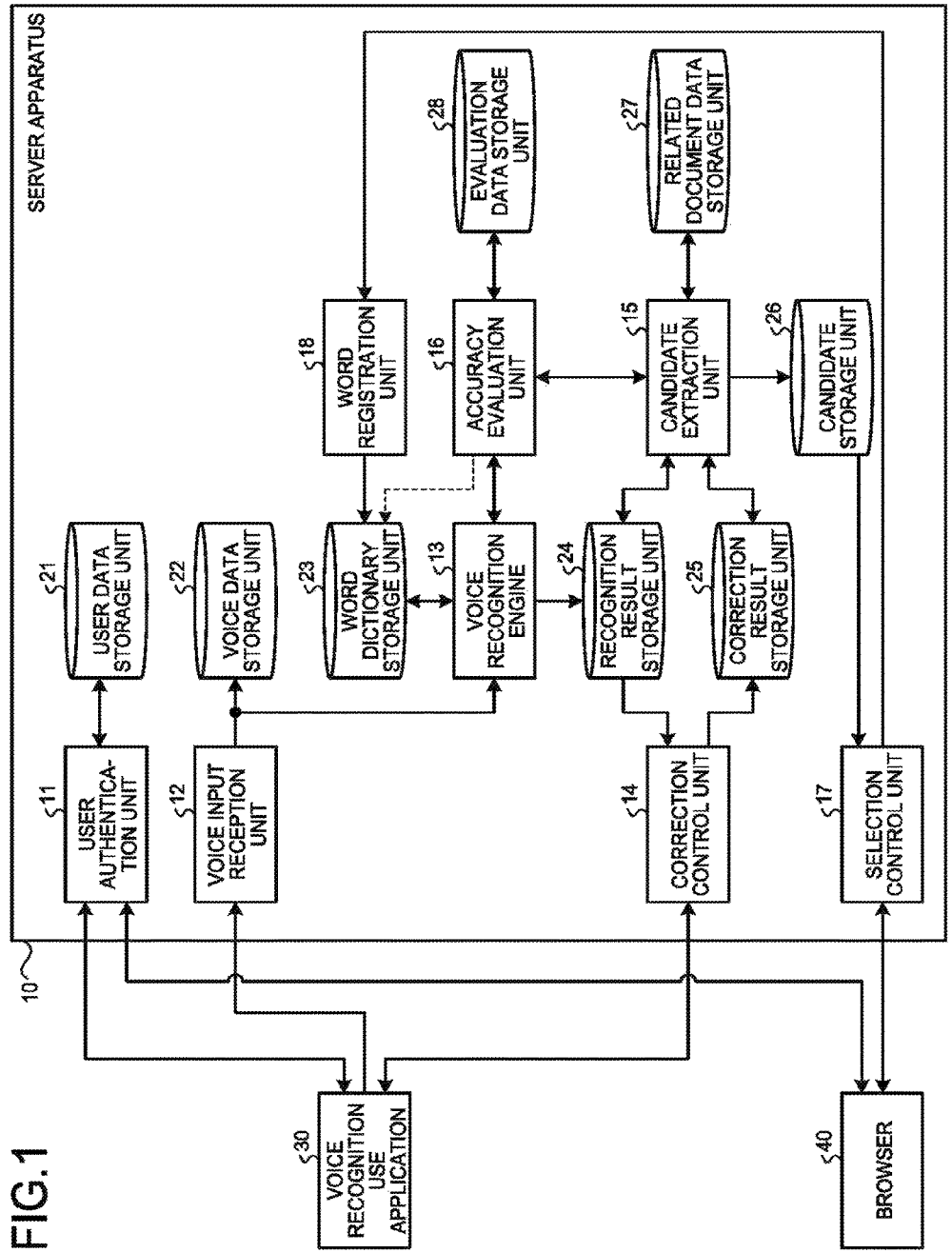
FIG. 1 is a block diagram illustrating a functional configuration example of a server apparatus according to an embodiment.

FIG. 1 is a block diagram illustrating a functional configuration example of a server apparatus 10 of the present embodiment. The server apparatus 10 of the present embodiment is accessed from, for example, a voice recognition use application 30 or a browser 40 via a network. The voice recognition use application 30 is an arbitrary application using a voice recognition processing by the server apparatus 10 and operates on a client apparatus used by an arbitrary registered user. The client device includes, at least, computer resources serving as an execution environment of the voice recognition use application 30, a voice input device such as a pin microphone and a head set for inputting user's voice, a display device for displaying the recognition result text, an operation input device such as a mouse, a keyboard, a pointing device, a touch panel, and the like for inputting a correction operation on the recognition result text, and a communication device for connecting to the server apparatus 10 via the network.

The browser 40 is software for viewing a selection screen to be described later provided by the server apparatus 10 and operates on a client device used by, for example, an administrator of the system or an administrator of the voice recognition use application 30. The client device includes, at least, a computer resource as an execution environment of the browser 40, a display device for displaying a selection screen which will be described later, an operation input device such as a mouse, a keyboard, a pointing device, a touch panel or the like for inputting an operation on the selection screen, and a communication device for connecting to the server apparatus 10 via a network. The voice recognition use application 30 and the browser 40 may be configured to operate on a common client device. In other words, an administrator of a system that performs an operation for word registration using the browser 40, a manager of the voice recognition use application 30, or the like may perform the modification operation on the recognition result text using the voice recognition use application 30, and an end user of the voice recognition use application 30 may perform the operation for word registration using the browser 40.

As illustrated in FIG. 1, for example, the server apparatus 10 of the present embodiment includes a user authentication unit 11, a voice input reception unit 12, a voice recognition engine 13, a correction control unit 14, a candidate extraction unit 15, an accuracy evaluation unit 16, a selection control unit 17, and a word registration unit 18.

The user authentication unit 11 performs a login process to the system from the voice recognition use application 30 and the browser 40. Through the login process, the server apparatus 10 identifies the user who accesses the system, and grasps which user the voice received by the voice input reception unit 12 belongs to, which user the word registration operation is to be performed on, and the like. The user can utilize the service provided by the server apparatus 10 of the present embodiment by logging in to the system from the voice recognition use application 30 or the browser 40. It is assumed that the user who can log in to the system is registered in advance. User data on the user who is registered (a registered user) is accumulated in a user data storage unit 21. The user authentication unit 11 refers to the user data storage unit 21 and performs the login process. The user authentication unit 11 includes an application programming interface (API) and a user interface (UI) for performing the authentication.

FIG. 2 is a diagram illustrating an example of the user data D1 stored in the user data storage unit 21. For example, as illustrated in FIG. 2, the user data D1 includes a user ID, a user name, and a correction task proficiency level. The user ID is identification information uniquely assigned to each registered user. The user name is a unique name for identifying the user. In the login process, the user inputs or selects a user name. The correction task proficiency level is used to calculate a score of the candidate extracted by the candidate extraction unit 15 to be described later. A method of setting and using the correction task proficiency level will be described later. The user data D1 may include other information such as a user's mail address and a password for authentication.

The voice input reception unit 12 receives a voice input from the voice recognition use application 30 and stores the input voice and a voice data including additional information on the input voice in a voice data storage unit 22. Continuous voice delimited according to an explicit operation by the user such as on/off of a voice input button or detection of interruption of the user's utterance for a predetermined time or more is input from the voice recognition use application 30. The voice input reception unit 12 stores the continuous voice as a single voice to the voice data storage unit 22.

FIG. 3 is a diagram illustrating an example of the voice data D2 stored in the voice data storage unit 22. For example, as illustrated in FIG. 3, the voice data D2 includes a voice ID, a user ID, a voice, and a date and time of utterance. The voice ID is identification information uniquely assigned to each voice. The user ID indicates the user who uttered the voice. Voice is a byte data of the voice itself. The date and time of utterance indicates the date and time when the utterance of the voice was made.

The voice whose input has been received by the voice input reception unit 12 is read directly from the voice input reception unit 12 or temporarily stored in the voice data storage unit 22, and sent to the voice recognition engine 13.

The voice recognition engine 13 performs the voice recognition processing on the voice whose input is accepted by the voice input reception unit 12 using a word dictionary held by a word dictionary storage unit 23. There is a corresponding single word dictionary for each user, and the voice recognition processing is performed using a word dictionary corresponding to a user requesting the voice recognition processing. There may be a word dictionary shared by a plurality of users, and the user may select the shared word dictionary and perform a voice recognition processing and a word registration operation to be described later.

FIG. 4 is a diagram illustrating an example of the word dictionary D3 held by the word dictionary storage unit 23. In the example and examples described below, they are described in a case where object language to be processed by the voice recognition processing is Japanese. However, the embodiment is not limited to this case. In the embodiment, the object language may be any language other than Japanese. For example, as illustrated in FIG. 4, the word dictionary D3 includes a word ID, a notation, and a reading. The word ID is identification information uniquely assigned to each word registered in the word dictionary D3. The notation indicates how the word is displayed. The reading includes hiragana and katakana, that are Japanese syllabary characters, for taking correspondence with phonemes of the word. Multiple readings may be registered for one word. The word dictionary D3 may include other information such as part of word-class information of each word.

The result of the voice recognition processing by the voice recognition engine 13 is stored in a recognition result storage unit 24 as a recognition result data. FIG. 5 is a diagram illustrating an example of a recognition result data D4 stored in the recognition result storage unit 24. For example, as illustrated in FIG. 5, the recognition result data D4 includes a recognition result ID, a voice ID, a date and time of utterance, and a recognition result text (Japanese text in the example). The recognition result ID is identification information uniquely assigned to each recognition result. The voice ID indicates what voice the recognition result is a result of performing the voice recognition processing on. The date and time of utterance indicates the date and time when the utterance of the voice corresponding to the recognition result was performed. The recognition result text is a text data obtained as a result of the voice recognition processing. Since the voice recognition engine 13 performs the voice recognition processing by delimiting a single voice in sections where the utterance is not performed, a plurality of recognition results may be obtained for the single voice in some cases.

Upon receipt of a request from the voice recognition use application 30, the correction control unit 14 performs the correction to the recognition result text. For example, the correction control unit 14 generates a correction screen for displaying a recognition result text in a specified range, and corrects the recognition result text by accepting the correction operation by the user on the correction screen. However, the correction control unit 14 is not limited to the above example as long as the correction control unit 14 can acquire a correction result corresponding to the correction operation by the user on the recognition result text. The correction result by the correction control unit 14 is stored in a correction result storage unit 25 as correction result data.

FIG. 6 is a diagram illustrating an example of a correction result data D5 stored in the correction result storage unit 25. For example, as illustrated in FIG. 6, the correction result data D5 includes a correction result ID, a recognition result ID, a correction user ID, a date and time of correction, and a correction result text (Japanese text in the example). The correction result ID is identification information uniquely assigned to each correction result. The recognition result ID indicates what recognition result text the correction result has been obtained by performing the correction to. The correction user ID is a user ID of the user who performed the correction. The date and time of correction indicates the date and time when the correction was performed. The correction result text is a text data obtained by correcting the recognition result text. The correction to the recognition result text can be applied not only to the recognition result text obtained by performing the voice recognition processing on the user's utterance but also to the recognition result text obtained by performing the voice recognition processing on utterance of another user. The correction control unit 14 or the voice recognition use application 30 may be configured to limit the user who can perform a correction on a recognition result text.

The candidate extraction unit 15 refers to the recognition result storage unit 24 and the correction result storage unit 25, and extracts candidates of words to be additionally registered in the word dictionary D3 based on the recognition result text included in the recognition result data D4 and the correction result text included in the correction result data D5. The candidate extraction unit 15 is called, for example, in response to a request for generation of a selection screen to be described later from the browser 40. Extraction of the candidate is performed, for example, by detecting a difference between the correction result text and the recognition result text. In other words, for example, based on the recognition result text (Japanese text), " 理解あは人の動きを把握し認識します " whose recognition result ID is 65 as illustrated in FIG. 5 and correction result text (Japanese text) " リカイアは人の 動きを把握し認識します " whose correction result ID is 32 as illustrated in FIG. 6, the candidate extraction unit 15 determines that a section " 理解あ (being romanized as LIKAIA)" included in the recognition result text is detected as: " リカイア (being romanized as LICAIA)" as a difference of the correction result text with respect to the recognition result text, and extracts " リカイア " included in the correction result text as a candidate of a word to be additionally registered in the word dictionary D3. When detecting the difference of the correction result text with respect to the recognition result text, a post-processing may be performed such that the correction result text is subjected to morphological analysis and only portions considered to be a noun in or in the vicinity of the difference is to be extracted.

The candidates extracted by the candidate extraction unit 15 are stored in a candidate storage unit 26 as candidate data. FIG. 7 is a diagram illustrating an example of candidate data D6 stored in the candidate storage unit 26. For example, as illustrated in FIG. 7, the candidate data D6 includes a candidate ID, a notation, a reading, a correction result ID, an accuracy improvement contribution ratio, a score, score increase factor information, and score decrease factor information.

The candidate ID is identification information uniquely assigned to each candidate extracted by the candidate extraction unit 15. The notation is obtained from the correction result text. Reading is done by using notation as it is when the notation is Hiragana or Katakana, otherwise it is obtained by referring to an external dictionary describing a correspondence between the notation and the reading. Further, for the candidates for which reading is not known, the reading may be left blank and the user may additionally add a reading on a selection screen to be described later. For the candidate whose notation is indicated by an alphabet, a combination of an alphabetical reading may be recorded as a reading of the candidate.

The correction result ID indicates which correction result text the candidate was extracted from. When the same candidate is extracted from a plurality of correction result texts, a plurality of correction result IDs corresponding to the plurality of correction result texts from which the candidate has been extracted are recorded in the correction result ID of the candidate.

The accuracy improvement contribution ratio indicates how much a recognition accuracy of the voice recognition engine 13 improves by additionally registering the candidate in the word dictionary D3. The accuracy improvement contribution ratio is calculated, for example, by evaluating the recognition accuracy of the voice recognition engine 13 before and after registration of the candidate by the accuracy evaluation unit 16. In the case where the recognition accuracy of the voice recognition engine 13 improves, for example, by 1.0 points before and after the registration of the candidate, in other words, when the difference between the recognition accuracy after the registration and the recognition accuracy before the registration of the candidate is +1.0 points, the accuracy improvement contribution rate of the candidate is 1.0. The evaluation of the recognition accuracy by the accuracy evaluation unit 16 will be described later.

The score indicates a priority of the candidate, and is calculated based on some score increase factors and score decrease factors. The score increase factor indicates a score increase factor used for calculating the score of the candidate, and the score decrease factor indicates the score decrease factor used for calculating the score of the candidate.

The score increase factor includes, for example, the cases in which the candidate is a word matching an important word in a related document to be described later, a correction frequency of the candidate is high since the candidate has been extracted from many correction result texts, an effect of improving the recognition accuracy is high, a correction task proficiency level of the user who performed the correction is high, and the like. On the other hand, as the score decrease factor includes, for example, the cases where the number of characters of the candidate is small, and the like.

The candidate extraction unit 15 determines presence or absence of the score increase factor and the score decrease factor for the candidate extracted from the correction result text, and increases or decreases a base score according to the score increase factor or score decrease factor, thus calculating the score of the candidate. An increase/decrease value of the score may be a fixed value for each factor. For example, as for the increase in score due to the correction frequency exceeding a reference value, it may be corrected in such a way that an increase value of the score increases as the correction frequency increases. The candidate extraction unit 15 records the score of each candidate thus calculated together with the score increase factor and score decrease factor used for calculating the score.

The candidate extraction unit 15 refers to a related document data storage unit 27 in which related document data regarding the related document is stored in order to determine whether or not there is a score increase factor where a word matches the important word in the related document. The related document is a document related to the voice recognition use application 30 that uses the service provided by the server apparatus 10. As the document, materials relating to a conference if the voice recognition use application 30 is to convert a voice in the conference into a text, a business manual if a dialog log at a call center is converted to text, and the like are considered.

FIG. 8 is a diagram illustrating an example of a related document data D7 stored in the related document data storage unit 27. For example, as illustrated in FIG. 8, the related document data D7 includes a document ID, a user ID, a file name, and an important word. The document ID is identification information uniquely assigned to each related document registered. The user ID indicates which user has registered the related document. The file name is a file name of the related document. The important word is an important word extracted from the relevant document and is extracted from the related document using an index of text processing such as TF-IDF, for example.

The candidate extraction unit 15 searches the related document data D7 for an important word matching the notation of the candidate extracted from the correction result text. When the important word matching the notation of the candidate is found, the candidate extraction unit 15 increases a score of the candidate and records "important word in related document" as the score increase factor.

Further, in order to determine presence or absence of the score increase factor where the correction frequency is high, the candidate extraction unit 15, for example, counts the number of the correction result ID recorded in the candidate data D6 for candidates extracted from the correction result text, and determines whether or not the number of correction ID is equal to or larger than a reference value (for example, 3). If the number of correction result ID recorded in the candidate data D6 is equal to or larger than the reference value (that is, the correction frequency is equal to or larger than the reference value), the score of the candidate is increased and "correction frequency is high" is recorded as the score increase factor.

Further, in order to determine presence or absence of the score increase factor where the effect of improving the recognition accuracy is high, the candidate extraction unit 15, for example, compares the accuracy improvement contribution ratio recorded in the candidate data D6 with a predetermined threshold value (for example, 1.0 points) with respect to the candidate extracted from the correction result text, and determines whether or not the accuracy improvement contribution rate is equal to or larger than the threshold value. If the accuracy improvement contribution rate is equal to or larger than the threshold value, it is determined that the effect of improving the recognition accuracy is high, and the score of the candidate is increased, and "effect of improving accuracy is high" is recorded as the score increase factor.

Further, in order to determine whether or not there is a score increase factor where a correction task proficiency level of the user who performed the correction is high, the candidate extraction unit 15 first searches the correction result data D5 with the correction result ID recorded in the candidate data D6 as a key, with respect to the candidates extracted from the correction result text, and acquires the corresponding correction user ID. Subsequently, the candidate extraction unit 15 searches the user data D1 by using the acquired correction user ID as a key, and acquires the correction task proficiency level of the user who performed the correction. Then, the candidate extraction unit 15 compares the acquired correction task proficiency level with a predetermined value (for example, 15). If the correction task proficiency level is equal to or larger than the predetermined value, the candidate extraction unit 15 determines that the correction task proficiency level of the user who performed the correction is high. Then, the score of the candidate is increased, and "correction by proficient user" is recorded as the score increase factor.

Further, in order to determine presence or absence of a score decrease factor where the number of characters of the candidate is small, the candidate extraction unit 15, for example, compares the number of characters in the notation registered in the candidate data D6 with a predetermined number (for example, 3), with respect to the candidate extracted from the correction result text, and determines whether or not the number of characters in the notation is equal to or smaller than a predetermined number. If the number of characters in the notation is equal to or smaller than the predetermined number, it is determined that the number of characters of the candidate is small. Then, the score of the candidate is decreased, and "short word" is recorded as the score decrease factor.

The accuracy evaluation unit 16 for evaluating the recognition accuracy of the voice recognition engine 13 will now be described. The accuracy evaluation unit 16 evaluates the recognition accuracy of the voice recognition engine 13 using evaluation data stored in an evaluation data storage unit 28. FIG. 9 is a diagram illustrating an example of evaluation data D8 stored in the evaluation data storage unit 28. For example, as illustrated in FIG. 9, the evaluation data D8 includes an evaluation data ID, an evaluation voice, and a transcribed text (Japanese text in the example). The evaluation data ID is identification information uniquely assigned to each evaluation data stored in the evaluation data storage unit 28. The evaluation voice is byte data of voice used for evaluation. The transcribed text is a text transcribed by a creator of the evaluation data D8 and is a correct text corresponding to the evaluation voice.

The accuracy evaluation unit 16 inputs the evaluation voice included in the evaluation data D8 to the voice recognition engine 13, and compares the recognition result text obtained by the voice recognition engine 13 performing the voice recognition processing on the evaluation voice with the transcribed text corresponding to the evaluation voice. Based on a degree of matching between the recognition result text and the transcribed text, the recognition accuracy of the voice recognition engine 13 is evaluated. As the degree of matching between the recognition result text and the transcribed text, for example, a character correctness rate or the like is used. Using the accuracy evaluation unit 16, the recognition accuracy of the voice recognition engine 13 is evaluated in the case where the candidate extracted by the candidate extraction unit 15 is handled as a word included in the word dictionary D3, whereby the accuracy improvement contribution rate can be calculated.

The selection control unit 17 generates a selection screen for displaying the candidate extracted by the candidate extraction unit 15 selectably and, at the same time, displaying information indicating an influence on the voice recognition processing at least when the candidate is additionally registered in the word dictionary D3, and accepts an operation of selecting a candidate displayed on the selection screen.

Figure 10:
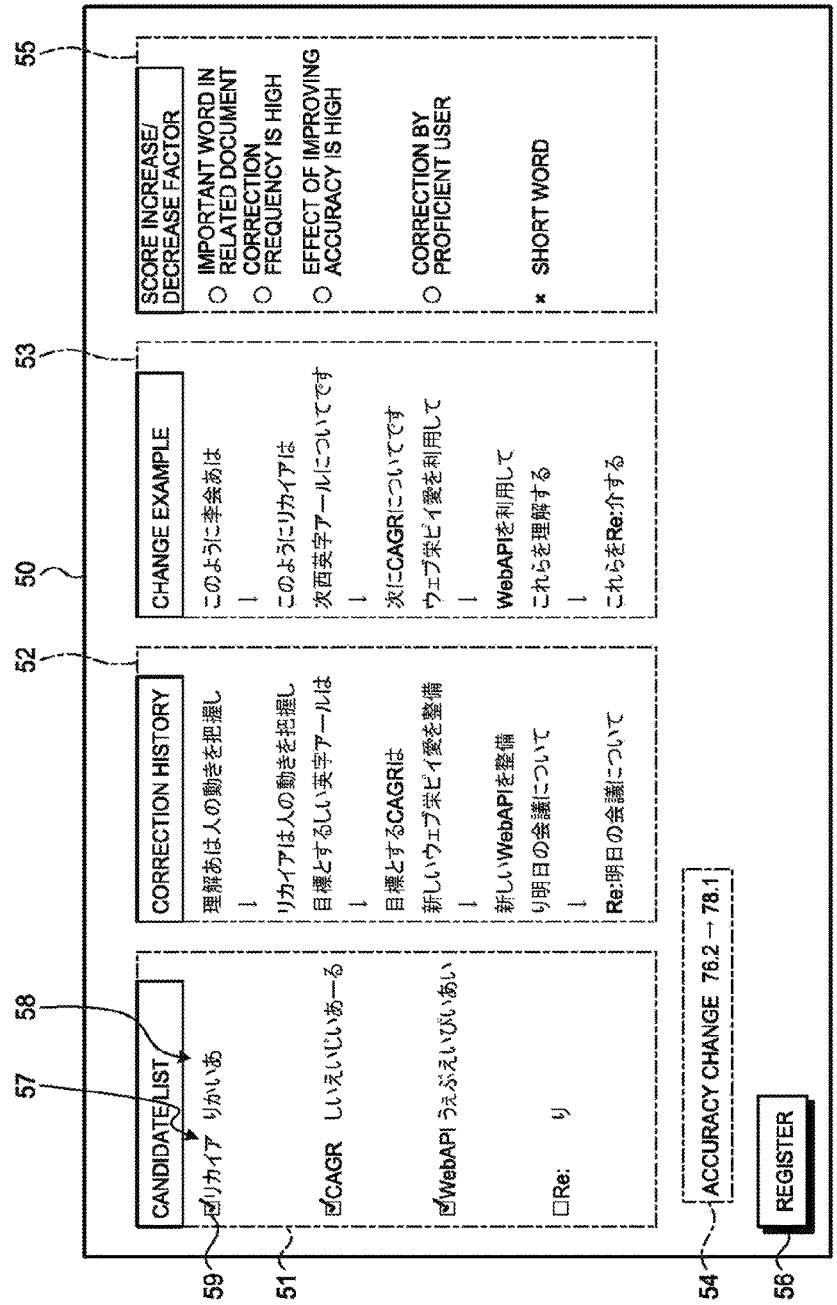
FIG. 10 is a diagram illustrating an example of a selection screen.

FIG. 10 is a diagram illustrating an example of a selection screen 50 generated by the selection control unit 17. For example, as illustrated in FIG. 10, the selection screen 50 includes a candidate list display area 51, a correction history display area 52, a change example display area 53, an accuracy change display area 54, a score increase/decrease factor display area 55, and a "register" button 56.

In the candidate list display area 51, a list of candidates (a candidate list) extracted by the candidate extraction unit 15 is displayed. The candidate list is obtained by arranging candidates extracted by the candidate extraction unit 15 in descending order of scores. Each candidate included in the candidate list is represented by a notation 57 and a reading 58, respectively. A check box 59 for selecting the candidate as a word to be additionally registered in the word dictionary D3 is arranged on the left side of each candidate. The score or the notation 57 and reading 58 of each candidate included in the candidate list are acquired from the above-described candidate data D6.

In the correction history display area 52, correction history corresponding to each candidate included in the candidate list is displayed. For example, the correction history is displayed in a form in which pairs of the recognition result text used for extraction of the candidate and the correction result text are associated with symbols such as arrows. For example, one correction result ID of each candidate is selected from the above-described candidate data D6, and the correction result text corresponding to the correction result ID and a recognition result text corresponding to the recognition result ID associated with the correction result ID are obtained to be displayed.

In the change example display area 53, a change example of the recognition result text corresponding to each candidate included in the candidate list is displayed. A change example of the recognition result text corresponding to each candidate is an example in which the recognition result text output by the voice recognition engine 13 changes before and after registering the candidate in the word dictionary D3 additionally. The change example in the recognition result text may include, for example, a case where a portion is detected in which a change occurs in the recognition result text output from the voice recognition engine 13 before and after registering the candidate in the word dictionary D3 additionally, and displays a pair of recognition result texts of a predetermined length including the portion where the change occurs in such a form that they are correlated with symbols such as arrows. In the case where a plurality of portions where the recognition result text changes are detected, the portion whose notation of the candidate is not included in the recognition result text after the registration is preferentially displayed, whereby the user can see a side effect caused by the additional registration of the candidate, such as a change in other portions due to the additional registration of the candidate in the word dictionary D3. In addition, the portion where the recognition result text before the registration is different from the recognition result text in the correction history may be preferentially displayed, whereby the user can see what influence exists other than the portion corrected by additionally registering the candidate in the word dictionary D3. A plurality of change examples corresponding to one candidate may be displayed.

In the accuracy change display area 54, when the currently selected candidate in the candidate list, that is, the candidate checked in the check box 59 is additionally registered in the word dictionary D3, an accuracy change indicating how the recognition accuracy of the voice recognition engine 13 changes from that before the registration is displayed. For example, the accuracy change is displayed in such a way that the recognition accuracy (the recognition accuracy before the registration) of the voice recognition engine 13 when the current word dictionary D3 is used in which none of the candidates included in the candidate list is registered and the recognition accuracy (the recognition accuracy after the registration) of the voice recognition engine 13 when the word dictionary D3 is used in which the currently selected candidate is additionally registered are associated with symbols such as arrows. The recognition accuracy after the registration is calculated as an approximate value, for example, by adding the above-described accuracy improvement contribution rate calculated for the currently selected candidate to the recognition accuracy before the registration. If there are a plurality of currently selected candidates, the accuracy improvement contribution rate of each candidate is added to the recognition accuracy before the registration. Therefore, the recognition accuracy after the registration varies according to the selected candidate, and the accuracy change indicating changes in the recognition accuracy before and after the registration is displayed so as to change according to the selected candidate.

The change example of the recognition result text displayed in the change example display area 53 and the change in accuracy displayed in the accuracy change display area 54 are information representing the influence on the voice recognition processing when the candidate is additionally registered in the word dictionary D3. By referring to these pieces of information displayed on the selection screen 50, the user can appropriately determine whether to additionally register each candidate included in the candidate list in the word dictionary D3.

In the score increase/decrease factor display area 55, a score increase factor or score decrease factor corresponding to each candidate included in the candidate list is displayed. The score increase factor and the score decrease factor corresponding to each candidate are acquired from the above-described candidate data D6. That is, in the score increase/decrease factor display area 55, for example, "important word of relevant document", "correction frequency is high", "accuracy improvement effect is high", "correction by a proficient user", and the like are displayed as the score increase factor. Further, in the score increase/decrease factor display area 55, for example, "short word" and the like are displayed as the score decrease factor. By referring to these pieces of information displayed on the selection screen 50, the user can grasp the reason for determining the priority of each candidate included in the candidate list, and can judge whether to additionally register each candidate in the word dictionary D3 more appropriately.

The "register" button 56 is a button operated to confirm that the user additionally registers the candidate selected in the candidate list in the word dictionary D3. When the "register" button 56 of the selection screen 50 is operated, the selection control unit 17 determines the candidate selected at that time as a target of additional registration and notifies the word registration unit 18 of the pair of the notation 57 and the reading 58 of the candidate. Further, at this time, the selection control unit 17 acquires the correction result ID included in the candidate data D6 with respect to the candidate determined as the target of the additional registration and searches the correction result data D5 with the correction result ID as a key, whereby a correction user ID is acquired which indicates the user who performed the correcting operation that is the basis of the candidate extraction. Then, in the user data D1, the correction task proficiency level corresponding to the user ID matching the acquired correction user ID is increased by a fixed number.

The word registration unit 18 additionally registers the candidate selected on the selection screen 50 in the word dictionary D3. That is, the word registration unit 18 registers the pair of the notation 57 and the reading 58 of the candidate notified of from the selection control unit 17 in response to the operation of the "register" button 56 on the selection screen 50 in the word dictionary D3.

Figure 11:
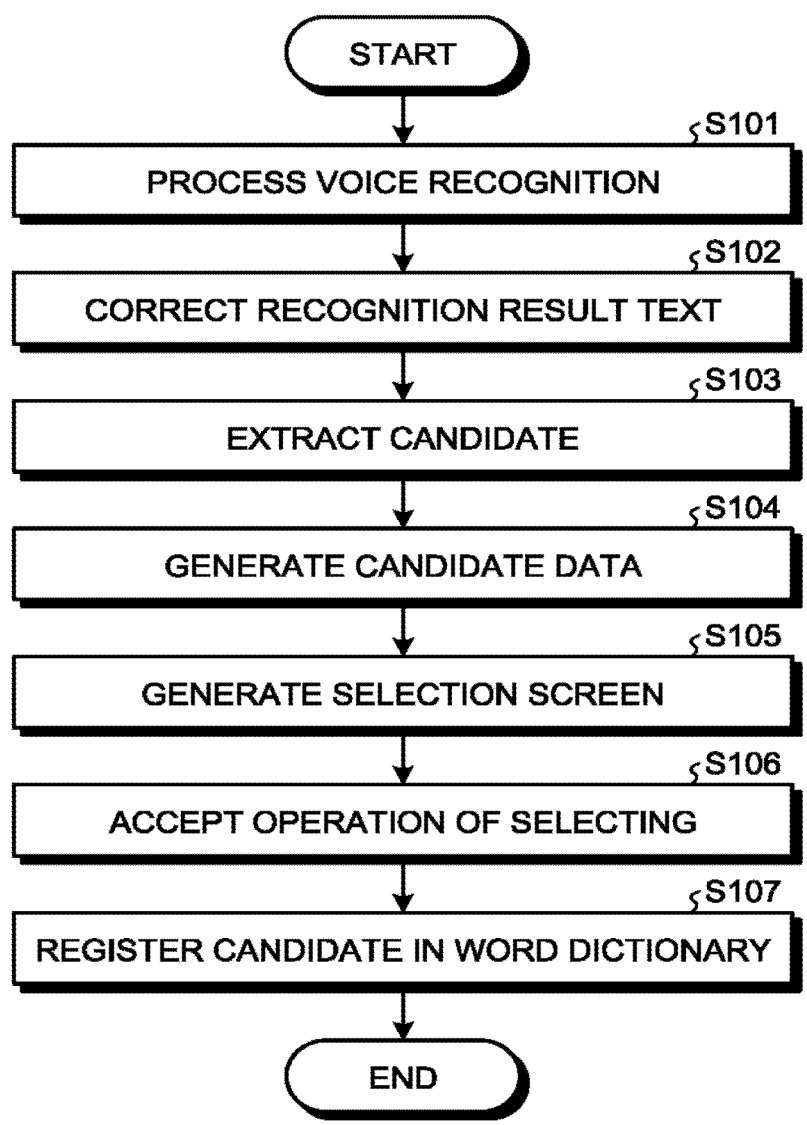
FIG. 11 is a flowchart illustrating an operation example of the server apparatus.

Next, an outline of a series of operation procedures by the server apparatus 10 of the present embodiment will be described with reference to FIG. 11. FIG. 11 is a flowchart illustrating an operation example of the server apparatus 10 according to this embodiment.

First, the voice recognition engine 13 performs voice recognition processing using the word dictionary D3 with respect to the voice input from the voice recognition use application 30, and stores the recognition result as the recognition result data D4 in the recognition result storage unit 24 (Step S101).

Subsequently, the correction control unit 14 corrects the recognition result text included in the recognition result data D4 according to the correction operation by the user, and stores the correction result as the correction result data D5 in the correction result storage unit 25 (Step S102).

Subsequently, the candidate extraction unit 15 extracts the candidate of the word to be additionally registered in the word dictionary D3 based on the recognition result text included in the recognition result data D4 and the correction result text included in the correction result data D5 (Step S103). Then, the candidate extraction unit 15 generates the candidate data D6 related to the candidate extracted in Step S103, and stores the generated candidate data in the candidate storage unit 26 (Step S104).

Subsequently, the selection control unit 17 generates the selection screen 50 as illustrated in FIG. 10 on the basis of the candidate data D6 (Step S105), and accepts the operation of the user who selects the candidate displayed on the selection screen 50 (Step S106).

Finally, the word registration unit 18 additionally registers the candidate selected by the user on the selection screen 50 in the word dictionary D3 (Step S107), and the series of operations of the server apparatus 10 is completed.

As described above in detail with a specific example, the server apparatus 10 of the present embodiment extracts the candidate of the word to be additionally registered in the word dictionary D3, based on the recognition result text obtained by the voice recognition engine 13 performing the voice recognition processing using the word dictionary D3 and the correction result text obtained by correcting at least a part of the recognition result text. Then, a selection screen 50 is generated for displaying the extracted candidate selectably and, at the same time, displaying information representing an influence on the voice recognition processing at least when additionally registering the candidate in the word dictionary D3, and an operation of selecting the candidate displayed on the selection screen 50 is input. Then, the candidate selected on the selection screen 50 is additionally registered in the word dictionary D3. Therefore, according to the server apparatus 10 of the present embodiment, it is possible to select the word to be additionally registered in the word dictionary D3 while the user is allowed to recognize the influence on the voice recognition processing when the candidate of the word to be additionally registered in the word dictionary D3 is additionally registered in the word dictionary D3 actually. Thus, it is possible to effectively suppress inconvenience of additionally registering words which should not be registered in the word dictionary D3.

The server apparatus 10 of the present embodiment can be realized, for example, by cooperation of hardware constituting a general computer and a program (software) executed by a computer. For example, when the computer executes a predetermined program, the user authentication unit 11, the voice input reception unit 12, the voice recognition engine 13, the correction control unit 14, the candidate extraction unit 15, the accuracy evaluation unit 16, the selection control unit 17, and the word registration unit 18 can be implemented. Further, with the use of a mass storage device provided in the computer, the above-described user data storage unit 21, the voice data storage unit 22, the word dictionary storage unit 23, the recognition result storage unit 24, the correction result storage unit 25, the candidate storage unit 26, the related document data storage unit 27 and the evaluation data storage unit 28 can be implemented. The candidate storage unit 26 may be implemented by using a storage device such as a RAM that temporarily holds data.

Figure 12:
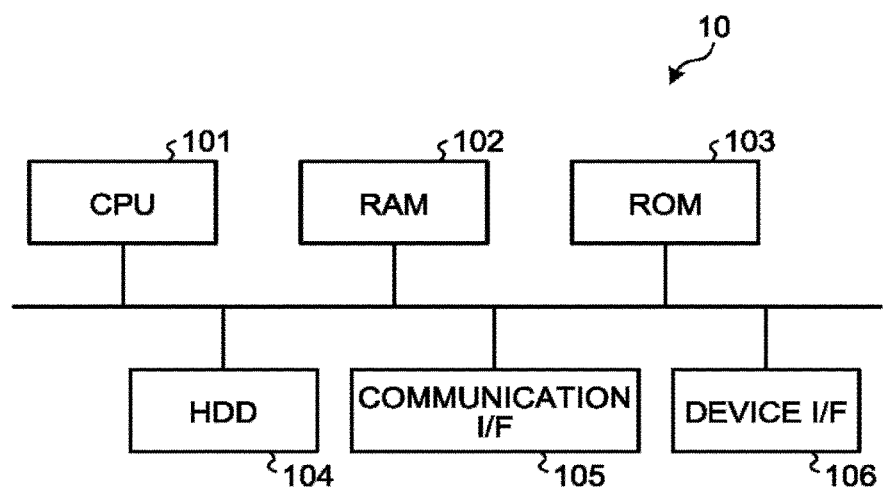
FIG. 12 is a block diagram illustrating a hardware configuration example of the server apparatus.

FIG. 12 is a block diagram illustrating a hardware configuration example of the server apparatus 10 according to the present embodiment. For example, as illustrated in FIG. 12, the server apparatus 10 has a hardware configuration as an ordinary computer which includes a hardware processor such as a CPU 101, a storage device such as a RAM 102 and a ROM 103, a mass storage device such as an HDD 104, a communication I/F 105 for communicating with the outside via a network, and a device I/F 106 for connecting peripheral devices.

At this time, the above program is provided by being recorded on a recording medium such as a magnetic disk, an optical disk, a semiconductor memory, or the like, for example. As long as the recording medium on which the program is recorded is a recording medium that can be read by a computer system, its storage format may be any form. Further, the above program may be installed in advance in the computer, or the above program distributed via a network may be appropriately installed in the computer.

The above program executed by the computer is configured as a module including functional parts of the user authentication unit 11, the voice input reception unit 12, the voice recognition engine 13, the correction control unit 14, the candidate extraction unit 15, the accuracy evaluation unit 16, the selection control unit 17, and the word registration unit 18, and the like. The above parts are generated on the main memory such as the RAM 102 by the hardware processor such as the CPU 101 reading and executing the program as appropriate.

The server apparatus 10 of the present embodiment may have a configuration in which a part or all of the functional parts described above are implemented by dedicated hardware such as an ASIC (Application Specific Integrated Circuit), FPGA (Field-Programmable Gate Array) and the like.

Further, the server apparatus 10 according to the present embodiment may be configured as a network system in which a plurality of computers are communicably connected, and may be implemented by distributing the above-described parts in a plurality of computers. Further, the server apparatus 10 of the present embodiment may be a virtual machine operating on a cloud system.

Further, in the above-described embodiment, an example of realizing a dictionary updating apparatus as an extended function of the voice recognition system has been exemplified, but the dictionary updating apparatus of the embodiment may be configured as a separate apparatus independent of the voice recognition system. In this case, the dictionary updating device is connected to the voice recognition system via, for example, a network, and performs processing after the recognition result text or the correction result text is acquired from the voice recognition system.

Further, in the above-described embodiment, configuration thereof has been explained with taking as an example the case where object language to be processed by the voice recognition processing is Japanese. However, the object language processed in the embodiment may be any language other than Japanese.

While certain embodiment have been described, the embodiment have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A dictionary updating apparatus comprising:
processing circuitry configured to function as:
a candidate extraction unit configured to extract, based on a recognition result text obtained by a voice recognition engine performing a voice recognition processing using a word dictionary and a correction result text obtained by correcting at least a part of the recognition result text, a candidate of a word to be additionally registered in the word dictionary;
a selection control unit configured to generate a selection screen on which the extracted candidate is displayed selectably and, at the same time, information indicating an influence on the voice recognition processing when the candidate is additionally registered in the word dictionary is displayed, and accept an operation of selecting the candidate displayed on the selection screen; and
a word registration unit configured to additionally register the candidate selected on the selection screen in the word dictionary, wherein
the information indicating the influence includes a pair of sentences representing a change in a recognition result of the voice recognition engine before and after additionally registering the candidate in the word dictionary.

2. The apparatus according to claim 1, wherein
the information indicating the influence includes information indicating a change in a recognition accuracy of the voice recognition engine before and after additionally registering the candidates candidate in the word dictionary.

3. The apparatus according to claim 2, wherein
when a plurality of extracted candidates are displayed selectably on the selection screen, the information indicating the change in the recognition accuracy is displayed so as to change according to selected candidates.

4. The apparatus according to claim 1, wherein
the selection control unit is configured to generate the selection screen on which a plurality of extracted candidates are displayed by arranging the candidates in descending order of a score indicating a priority of each of the candidates and, at the same time, information indicating a score increase factor or a score decrease factor of the score of each of the candidates is further displayed.

5. The apparatus according to claim 4, wherein
the information indicating the score increase factor includes information indicating that the candidate is a word matching an important word in a predetermined document.

6. The apparatus according to claim 4, wherein
the information indicating the score increase factor includes information indicating that a correction frequency of the candidate is equal to or larger than a reference value.

7. The apparatus according to claim 4, wherein
the information indicating the score increase factor includes information indicating that a recognition accuracy of the voice recognition engine is improved by additionally registering the candidate in the word dictionary.

8. The apparatus according to claim 4, wherein
the information indicating the score increase factor includes information indicating that the candidate is a word corrected by a user who is proficient in a correction operation.

9. The apparatus according to claim 4, wherein
the information indicating the score decrease factor includes information indicating that a number of characters of the candidate is a predetermined number or less.

10. A dictionary updating method comprising:
extracting, based on a recognition result text obtained by a voice recognition engine performing a voice recognition processing using a word dictionary and a correction result text obtained by correcting at least a part of the recognition result text, a candidate of a word to be additionally registered in the word dictionary;
generating a selection screen on which the extracted candidate is displayed selectably and, at the same time, information indicating an influence on the voice recognition processing when the candidate is additionally registered in the word dictionary is displayed, and accepting an operation of selecting the candidate displayed on the selection screen; and
registering additionally the candidate selected on the selection screen in the word dictionary, wherein
the information indicating the influence includes a pair of sentences representing a change in a recognition result of the voice recognition engine before and after additionally registering the candidate in the word dictionary.

11. A computer program product comprising a non-transitory computer-readable medium including programmed instructions, and the instructions causing a computer to execute:
extracting, based on a recognition result text obtained by a voice recognition engine performing a voice recognition processing using a word dictionary and a correction result text obtained by correcting at least a part of the recognition result text, a candidate of a word to be additionally registered in the word dictionary;
generating a selection screen on which the extracted candidate is displayed selectably and, at the same time, information indicating an influence on the voice recognition processing when the candidate is additionally registered in the word dictionary is displayed, and accepting an operation of selecting the candidate displayed on the selection screen; and
registering additionally the candidate selected on the selection screen in the word dictionary, wherein
the information indicating the influence includes a pair of sentences representing a change in a recognition result of the voice recognition engine before and after additionally registering the candidate in the word dictionary.

* * * * *